(12) United States Patent
Ito et al.

(10) Patent No.: US 10,005,418 B2
(45) Date of Patent: Jun. 26, 2018

(54) SEATBACK SIDE AND BASE MATERIAL FOR SEATBACK SIDE

(71) Applicant: TOYOTA BOSHOKU KABUSHIKI KAISHA, Aichi-ken (JP)

(72) Inventors: Muneharu Ito, Aichi-ken (JP); Tomohiro Nakao, Aichi-Ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 203 days.

(21) Appl. No.: 15/213,893

(22) Filed: Jul. 19, 2016

(65) Prior Publication Data
US 2017/0021793 A1  Jan. 26, 2017

(30) Foreign Application Priority Data
Jul. 21, 2015 (JP) .................. 2015-143577

(51) Int. Cl.
*B60R 21/207* (2006.01)
*B60R 21/215* (2011.01)
*B60N 2/015* (2006.01)
*B60N 2/90* (2018.01)
*B60J 10/80* (2016.01)
*B60N 2/58* (2006.01)

(52) U.S. Cl.
CPC ............ *B60R 21/207* (2013.01); *B60N 2/015* (2013.01); *B60N 2/986* (2018.02); *B60R 21/215* (2013.01); *B60J 10/80* (2016.02); *B60N 2002/5808* (2013.01); *B60R 2021/2078* (2013.01)

(58) Field of Classification Search
CPC ................ B60R 21/207; B60R 21/215; B60R 2021/2078; B60N 2/015; B60N 2/986; B60N 2/7041; B60N 2/2872; B60N 2002/5808; B60J 5/0413; B60J 5/0418; B60J 10/80
See application file for complete search history.

(56) References Cited

U.S. PATENT DOCUMENTS

| | | | | |
|---|---|---|---|---|
| 5,921,605 A * | 7/1999 | Musukula | ............ | B60N 2/0224 296/63 |
| 8,752,861 B2* | 6/2014 | Fukawatase | ........... | B60N 2/289 280/728.2 |
| 9,545,892 B2* | 1/2017 | Zimmermann | ....... | B60R 21/207 |
| 9,630,584 B2* | 4/2017 | Fujiwara | ............. | B60R 21/2171 |
| 9,896,053 B2* | 2/2018 | Tanabe | .................. | B60N 2/986 |
| 9,925,947 B2* | 3/2018 | Fujiwara | ............... | B60R 21/231 |
| 2005/0257979 A1* | 11/2005 | Hamada | ............. | B60R 21/2338 180/274 |

(Continued)

FOREIGN PATENT DOCUMENTS

| JP | 5-16022 | 4/1993 |
|---|---|---|
| JP | 2014-148251 | 8/2014 |

*Primary Examiner* — Barry Gooden, Jr.
(74) *Attorney, Agent, or Firm* — Greenblum & Bernstein, P.L.C.

(57) ABSTRACT

A base material for a seatback side includes a body portion including a protruding portion. The protruding portion has a plate piece surface of a distal end extending from the body portion outwardly relative to an outer portion provided on an outer side in a vehicle width direction. The plate piece surface is placed side by side with a flange surface of a flange portion projecting in a peripheral portion of the body. The distal end is sandwiched by a weather strip together with the flange portion.

7 Claims, 10 Drawing Sheets

(56) References Cited

U.S. PATENT DOCUMENTS

| | | | |
|---|---|---|---|
| 2006/0061073 A1* | 3/2006 | Naruse | B60R 21/21 280/730.2 |
| 2006/0254149 A1* | 11/2006 | Kanbara | B60J 10/24 49/377 |
| 2008/0110102 A1* | 5/2008 | Hotta | B29C 47/0023 49/498.1 |
| 2009/0039623 A1* | 2/2009 | Kawabe | B60R 21/207 280/728.3 |
| 2012/0324797 A1* | 12/2012 | Chiatti | B60J 10/22 49/475.1 |
| 2013/0175792 A1* | 7/2013 | Fukawatase | B60N 2/289 280/728.2 |
| 2016/0009247 A1* | 1/2016 | Fujiwara | B60R 21/2171 280/728.2 |
| 2016/0009248 A1* | 1/2016 | Tanabe | B60R 21/276 280/728.2 |
| 2016/0068129 A1* | 3/2016 | Tanabe | B60R 21/216 280/728.3 |
| 2016/0114751 A1* | 4/2016 | Saito | B60R 21/2176 297/216.13 |
| 2016/0159210 A1* | 6/2016 | Van Der Stap | B60J 10/21 49/475.1 |
| 2016/0244018 A1* | 8/2016 | Zimmermann | B60R 21/207 |
| 2016/0288671 A1* | 10/2016 | Zimmerman, II | B60N 2/2209 |
| 2017/0015227 A1* | 1/2017 | Tarumi | B60N 2/5841 |
| 2017/0066400 A1* | 3/2017 | Fujiwara | B60R 21/217 |
| 2017/0066402 A1* | 3/2017 | Fujiwara | B60R 21/231 |
| 2017/0305377 A1* | 10/2017 | Yoo | B60R 21/207 |
| 2018/0001860 A1* | 1/2018 | Tanabe | B60R 21/23138 |
| 2018/0001861 A1* | 1/2018 | Tanabe | B60R 21/23138 |
| 2018/0086299 A1* | 3/2018 | Kalinowski | B60R 21/207 |

* cited by examiner

SEATBACK SIDE AND BASE MATERIAL FOR SEATBACK SIDE

INCORPORATION BY REFERENCE

The disclosure of Japanese Patent Application No. 2015-143577 filed on Jul. 21, 2015 including the specification, drawings and abstract is incorporated herein by reference in its entirety.

BACKGROUND OF THE INVENTION

1. Field of the Invention

The present invention relates to a seatback side and a base material for the seatback side. The seatback side is disposed on an outer side in a vehicle width direction relative to an upright seatback of a rear seat.

2. Description of Related Art

There is a seatback side 93 as illustrated in FIG. 11. The seatback side 93 is disposed on an outer side in a vehicle width direction relative to a vehicle rear seatback 92 that supports a back of an occupant in an upright state, and is fixed to a body. When the occupant opens a door 95 to get in a vehicle, the occupant often puts his/her hand on the seatback side 93. On this account, a base material as a core of the seatback side 93 should be fixed to the body. In the meantime, fixation of the base material to the body is an attachment operation in a narrow compartment, and is a tough operation. In such a circumstance, there has been proposed an invention to improve workability of attachment and fixation of the base material to the body and to improve quality (e.g., Japanese Patent Application Publication No. 2014-148251 (JP 2014-148251 A), Japanese Examined Utility Model Application Publication No. 5-16022 (JP 5-16022 U).

SUMMARY OF THE INVENTION

However, in JP 2014-148251 A, although the improvement in workability at the time of attachment and fixation is excellent, a plug protrusion is inserted into a plug hole and just fixed, so a gap exists between the plug hole and the plug projection, which may slightly wobble a seatback side. Further, the seatback side is longitudinally elongated and it is difficult to increase the number of fixation parts in terms of a structure. Accordingly, the seatback side is fixed at two places such that plug protrusions are inserted into two plug holes provided on upper and lower sides. The plug holes and the plug protrusions are proposed to have an odd shape that is not a perfect-circle shape. However, when an external force is applied to either one of left and right sides that deviate from a line connecting the two places for fixation, the seatback side tends to wobble. Therefore, stable fixation like three-point fixation cannot be obtained. In JP 5-16022 U, a gap to occur between a seatback side edge and a body is hidden to attain quality improvement. However, a side cover corresponding to a base material for a seatback side of the present invention does not solve a problem with wobbling as indicated by a chained line in FIG. 1.

Further, recently, a product equipped with an air bag inside a seatback side such that the air bag is assembled to a base material has appeared. On this account, severer fixation is demanded for fixation of the base material to the body in order to stabilize a jumping-out angle of the air bag, as well as a measure to the situation in which the occupant puts his/her hand on the seatback side at the time of getting in a vehicle. Furthermore, for a measure for safety, firm and solid fixation of the seatback side is demanded in order that the seatback side is prevented from being removed from the body at the time of a collision.

The present invention provides a seatback side which does not wobble when a hand is put thereon at the time of getting in a vehicle, which is prevented from being removed from a body unexpectedly at the time of a collision, and further which stabilizes a jumping-out angle of an air bag in a case where the seatback side is equipped with the air bag, thereby contributing to safety improvement and quality improvement. The present invention also provides a base material for the seatback side.

A base material for a seatback side according to a first aspect of the present invention is a base material for a seatback side fixed to a body and disposed on an outer side in a vehicle width direction relative to an upright seatback of a rear seat. The base material includes a body portion including a protruding portion. The protruding portion has a plate piece surface of a distal end extending from the body portion outwardly relative to an outer portion provided on an outer side of the body portion in the vehicle width direction. The plate piece surface is placed side by side with a flange surface of a flange portion projecting in a peripheral portion of the body. The distal end is sandwiched by a weather strip together with the flange portion. Further, in the above aspect, a plurality of protruding portions may be placed along a side edge of the outer portion so as to be distanced from each other. Further, in the above aspect, the protruding portion may be placed along a side edge of the outer portion, and the protruding portion may be formed in a rib shape in which a length along the side edge of the outer portion is longer than a length projecting outwardly from the outer portion. Further, in the above aspect, the body portion may have an air-bag storage recess that is recessed from an outer surface side toward an inner surface side. A seatback side according to a second aspect of the present invention is a seatback side disposed on an outer side in a vehicle width direction relative to an upright seatback of a rear seat, and includes a base material fixed to a body and including a protruding portion extending from a body portion of the base material outwardly relative to an outer portion provided on an outer side of the body portion in the vehicle width direction; a pad covering an outer surface of the base material; and a skin covering an outer surface of the pad. A plate piece surface of a distal end of the protruding portion is placed side by side with a flange surface of a flange portion projecting in a peripheral portion of the body. The distal end is sandwiched by a weather strip together with the flange portion. In the above aspect, a plurality of protruding portions may be placed along a side edge of the outer portion so as to be distanced from each other. Further, in the above aspect, the body portion may have an air-bag storage recess that is recessed from an outer surface side toward an inner surface side.

According to the seatback side and the base material for the seatback side of the above aspects, the following effects can be obtained: the base material can be easily attached to the body by fixation thereto at three or more fixation places distanced from each other; even if a hand is put on the seatback side, the seatback side does not wobble; in a case where the air bag is equipped, a jumping-out angle thereof is stabilized; and further, the base material can be firmly fixed to the body so that the base material is not removed from the body unexpectedly at the time of a collision. This yields excellent effects in workability, safety improvement, quality improvement, and the like at a low cost.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
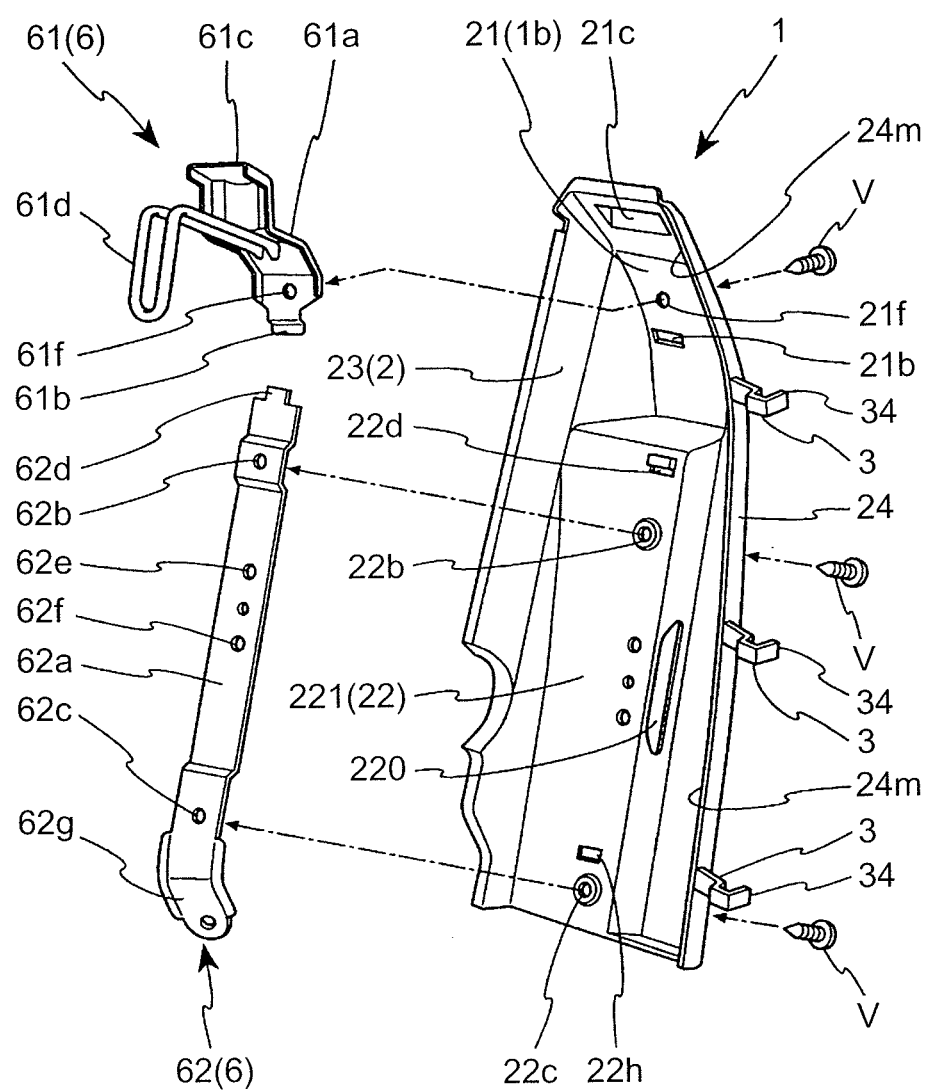
FIG. 1 is an exploded perspective view of one embodiment of a seatback side and a base material for the seatback side according to the present invention, illustrating the base material and a bracket.
Figure 2:
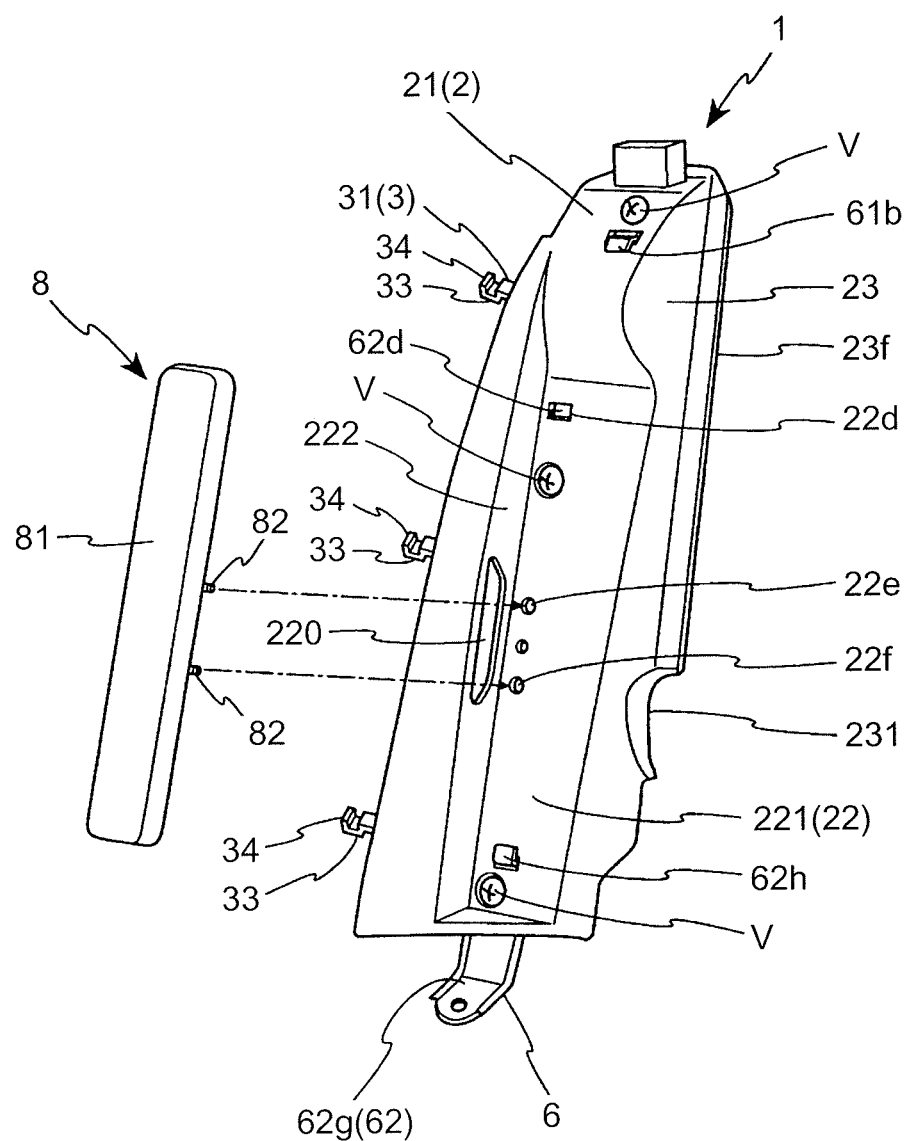
FIG. 2 is a perspective view of an outer surface side of the base material to which the bracket in FIG. 1 is attached, and an air back.
Figure 3:
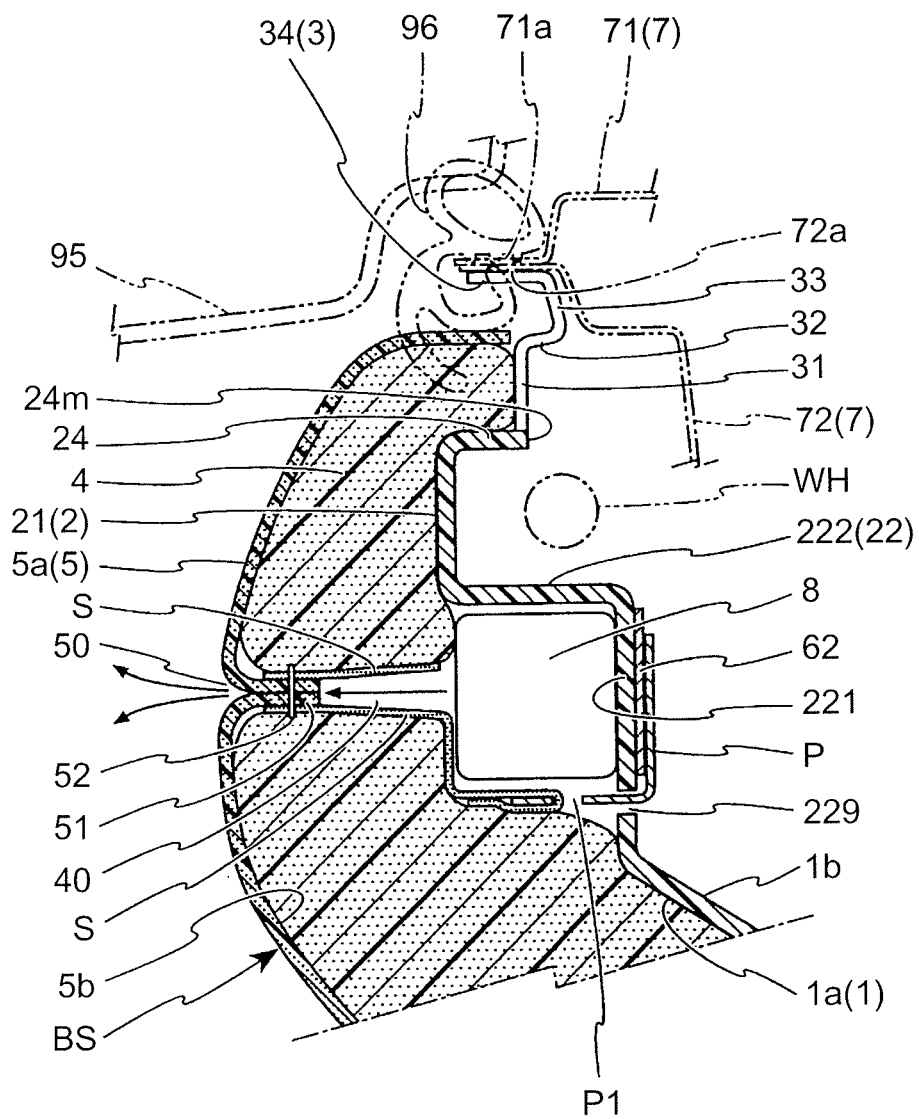
FIG. 3 is a cross-sectional view of the seatback side and a sectional view corresponding to a view taken along an arrow III-III in FIG. 11.
Figure 4A:
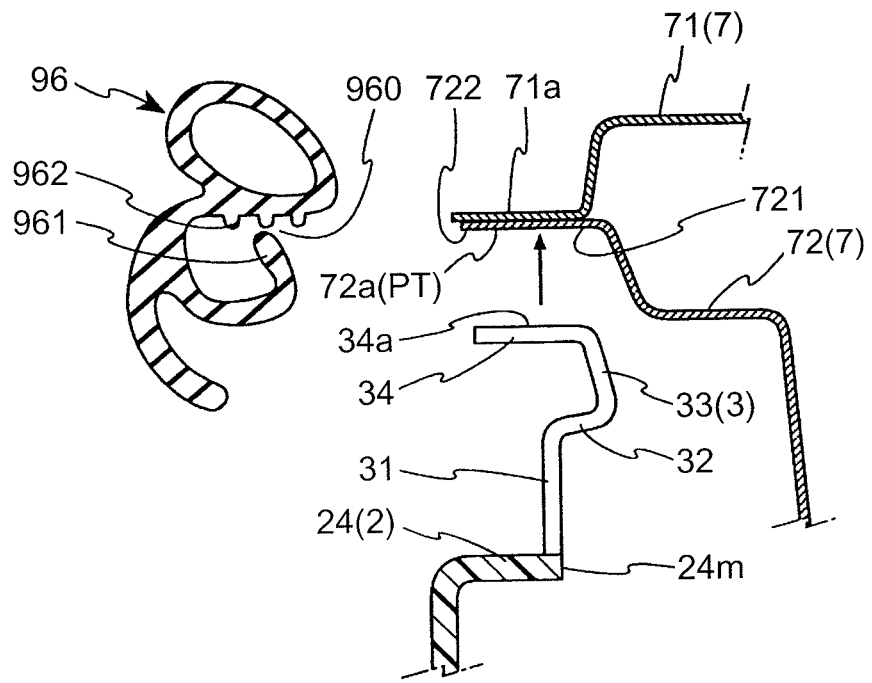
FIG. 4A is a partial enlarged view before a protruding portion is placed side by side with a flange surface of FIG. 3.
Figure 4B:
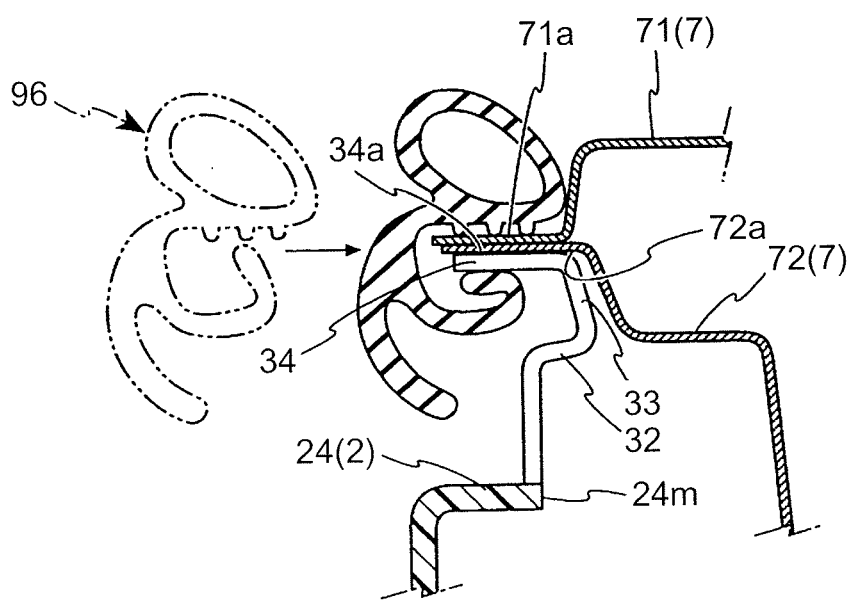
FIG. 4B is a partial enlarged view of FIG. 3.
Figure 5:
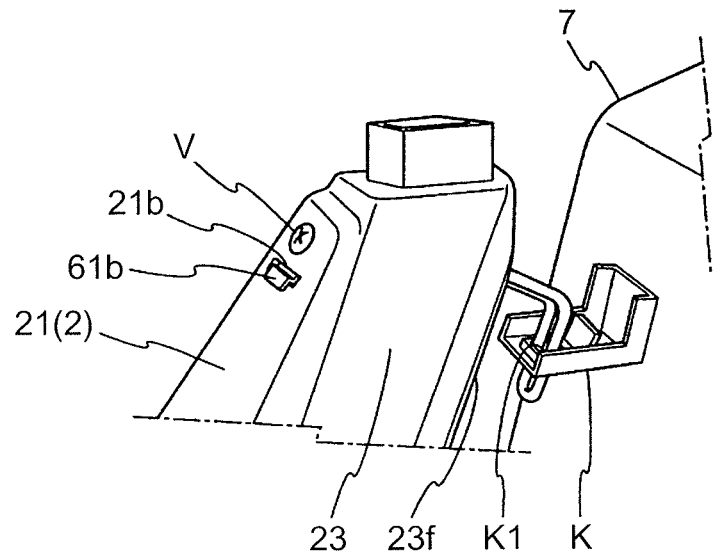
FIG. 5 is a partial perspective view illustrating a state where a first bracket is fixed to a body.
Figure 6:
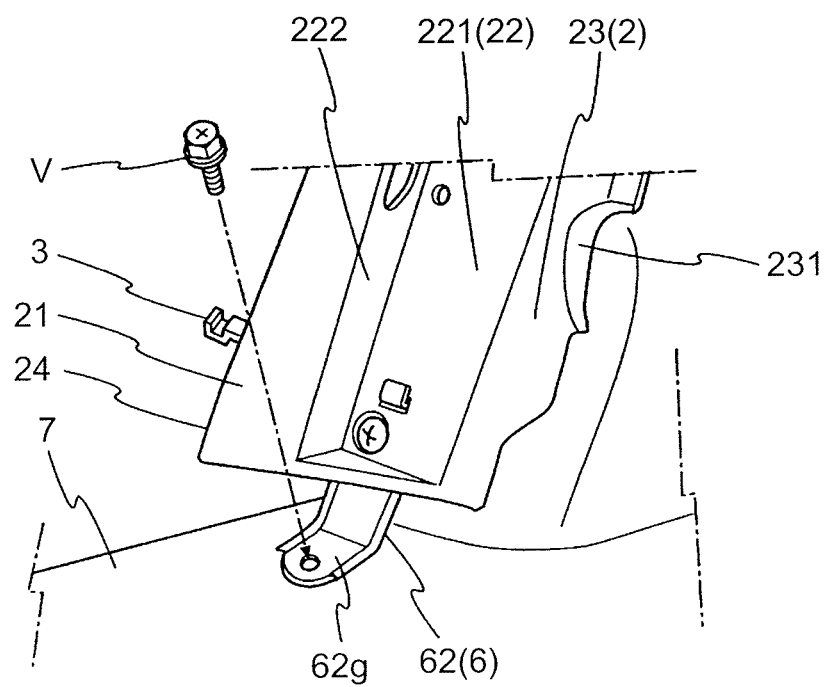
FIG. 6 illustrates a state where a second bracket is fixed to the body.
Figure 7:
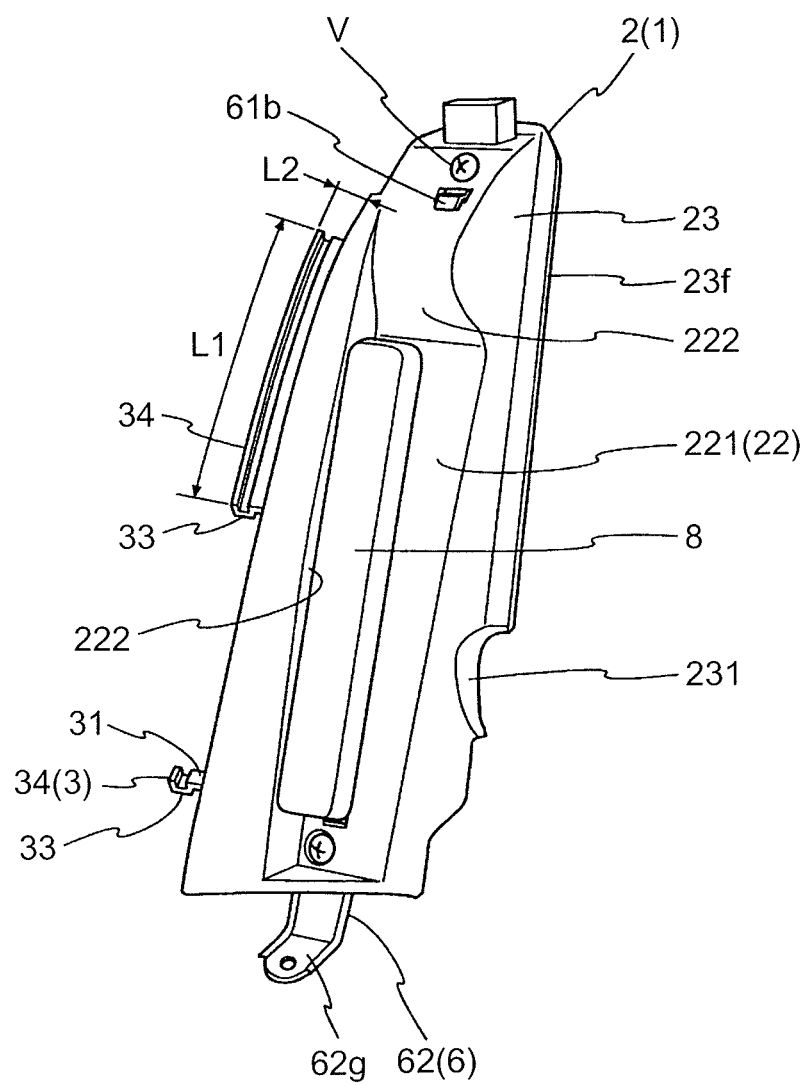
FIG. 7 is a perspective view illustrating an air bag being attached to a base material having another configuration as a substitute for the base material equipped with the bracket in FIG. 2.
Figure 8:
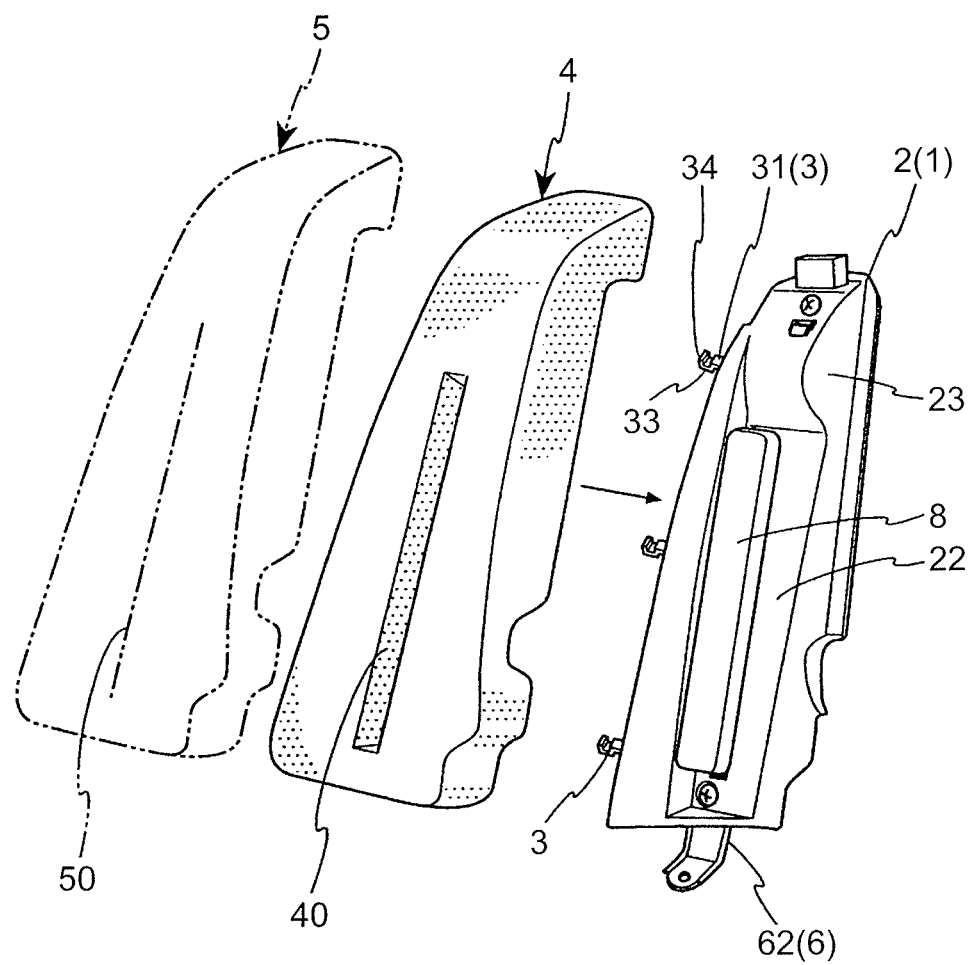
FIG. 8 is an exploded perspective view of a seatback side illustrating a state where the air bag is assembled to the base material equipped with the bracket as illustrated in FIG. 2, and then a pad and a skin are provided to cover them.
Figure 9:
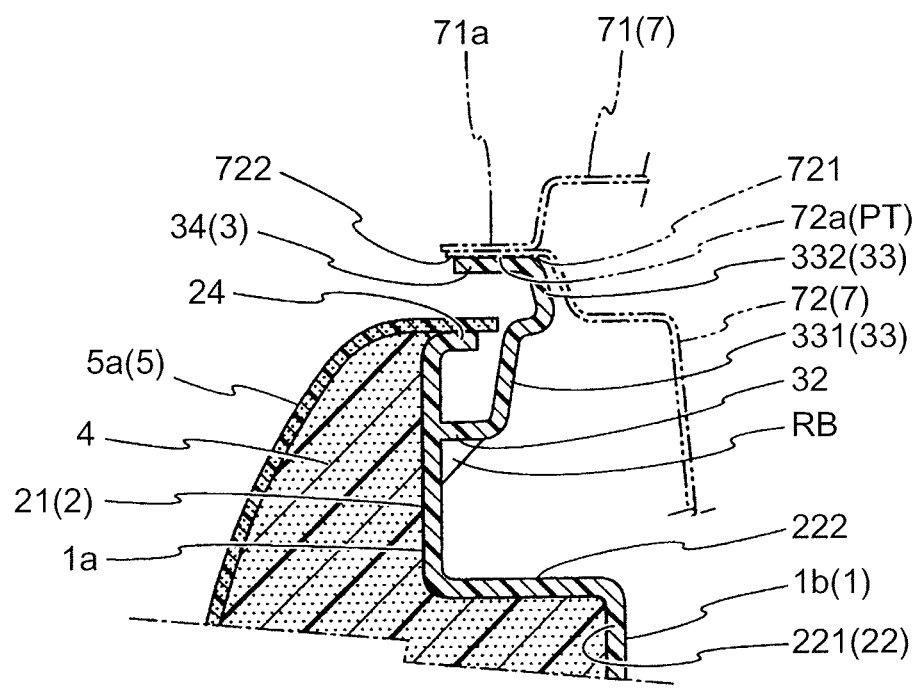
FIG. 9 is a cross-sectional view of a seatback side having another configuration as a substitute for the seatback side in FIG. 3.
Figure 10:
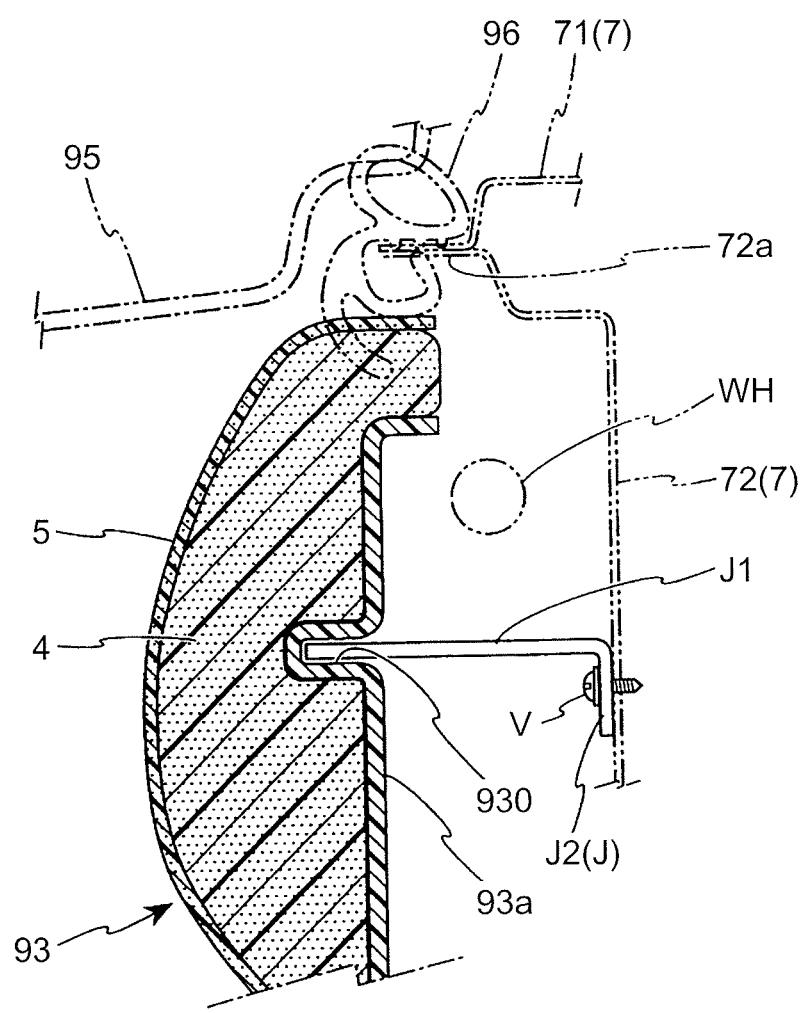
FIG. 10 is a reference drawing as a substitute for the seatback side in FIG. 3.

The following describes details of a seatback side and a base material for the seatback side according to the present invention. FIGS. 1 to 10 illustrate one embodiment of the seatback side and the base material for the seatback side according to the present invention: FIG. 1 is an exploded perspective view the base material for the seatback side and a bracket; FIG. 2 is a perspective view of an outer surface side of the base material to which the bracket in FIG. 1 is attached and an air bag; FIG. 3 is a cross-sectional view of the seatback side; FIG. 4A is a partial enlarged view before a protruding portion is placed side by side with a flange surface of FIG. 3; FIG. 4B is a partial enlarged view of FIG. 3; FIG. 5 is a partial perspective view illustrating a state where a first bracket is fixed to a body; FIG. 6 is a partial perspective view illustrating a state where a second bracket is fixed to the body; FIG. 7 is a perspective view of a base material having another configuration as a substitute for the base material equipped with the bracket in FIG. 2; FIG. 8 is an exploded perspective view of the seatback side, illustrating a state where a pad and a skin are provided to cover the base material; FIG. 9 is a cross-sectional view of a seatback side having another configuration; and FIG. 10 is a reference drawing as a substitute for the seatback side in FIG. 3. Note that in order to easily understand the drawings, the drawings simplify an entire shape by omitting a reinforcing rib and the like except an essential part of the base material 1, including an air bag 8, and some hatchings showing a section are omitted. Further, thicknesses of a body portion 2, a protruding portion 3, and the like are emphasized and illustrated slightly larger.

Figure 11:
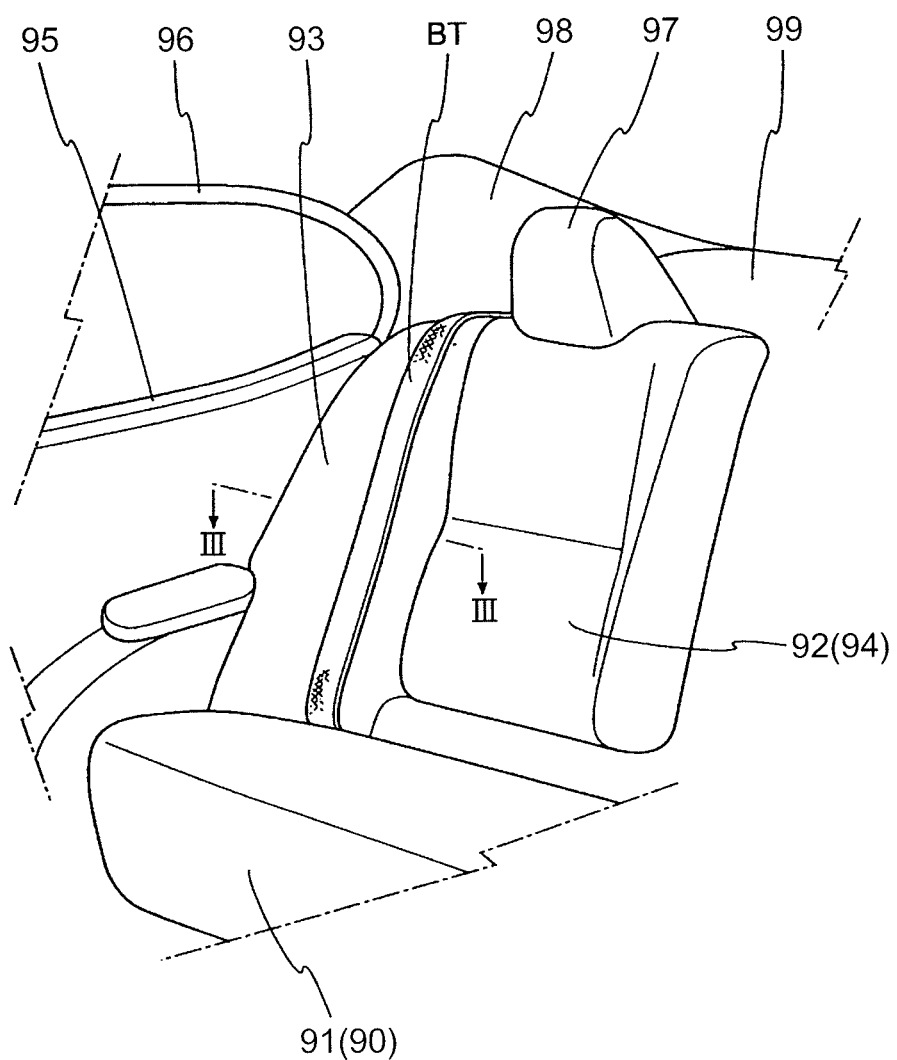
FIG. 11 is an explanatory perspective view around a rear seat of an automobile.

As illustrated in FIG. 11, a seatback side 93 may be disposed on an outer side in a vehicle width direction relative to an upright rear seatback 92 of a vehicle rear seat 90. A seatback 92 is tiltable relative to a seat cushion 91 as a seat, whereas the seatback side 93 is maintained to be fixed to a body 7. The present invention designs a seatback side BS that is firmly fixed to the body 7. A base material 1 for the seatback side (hereinafter just referred to as the "base material") is configured such that fixation to the body 7 via the protruding portion 3 is enhanced in addition to fixation to the body 7 via a lug portion directly provided in the base material 1 or a bracket 6 provided as another body (FIG. 3). The base material 1 of the present embodiment has attachment through-openings for two brackets 6 to be fixed to the body 7.

The base material 1 is made of resin, and the protruding portion 3 is provided in the body portion 2 in an extending manner. The base material 1 fixed to the body 7 is a resin molded product that is elongated in line with a longitudinal length of the rear seat 90 in an upright state on a back-surface-5b side of a skin 5. An outer surface 1a of the base material 1 is covered with a pad 4, and then the skin 5, and hereby the seatback side BS is obtained. An appearance of this seatback side BS is generally the same as an appearance of the seatback side 93 in FIG. 11 configured to fill a space from the seatback 92 in an upright state to a compartment side wall near a door opening on the outer side the vehicle width direction. The base material 1 serves as a core retaining a shape of the seatback side BS via the pad 4, on the back-surface-5b side of the skin 5. Here, the "vehicle width direction," an "upper side," and a "vehicle front side" referred to in the present invention indicate a "right-left direction on a plane of paper", an "upper side on the plane of paper," and a "forward direction on the plate of paper," in a perspective view of the base material 1 as illustrated in FIG. 2 in accordance with a posture of a base material incorporated in the seatback side 93 of FIG. 11. The base material 1 is the seatback side BS positioned on a right side of the rear seat 90 in a vehicle traveling direction, and the "outer side in the vehicle width direction relative to a seatback" is a left side on the plane of paper of FIG. 2.

The body portion 2 of the base material 1 includes a front surface portion 21, an inner portion 23, and an outer portion 24. Further, in the present embodiment, the seatback side BS is equipped with the air bag 8 (more specifically, an air bag device), and the front surface portion 21 has an air-bag storage recess 22. The front surface portion 21 is an elongated plate shape in line with a longitudinal length of the rear seat 90 in an upright state on the back-surface-5b side of the skin 5, as illustrated in FIGS. 1, 2, and the air-bag storage recess 22 is formed in a lower region so as to be recessed from an outer-surface-1a side toward an inner-surface-1b side. A part of the front surface portion 21 in which the air bag 8 is stored is configured such that a vertical wall 222 is directed from the outer-surface-1a side toward the inner-surface-1b side, and a distal edge thereof is connected to a flat bottom wall 221 placed one-step lower than the front surface portion 21. Thus, the recess 22 is formed as illustrated in FIG. 2. Attachment holes 22e, 22f for the air bag 8 are provided in the bottom wall 221. A reference sign 220 indicates a through hole.

In the body portion 2, through openings 21b, 21c, 21f for a first bracket 61 are formed as attachment through-openings for the bracket 6 in an upper area of the front surface portion 21, and through-openings 22b to 22d, 22h for a plate-shaped second bracket 62 are formed in the bottom wall 221 of the recess 22. In order to fix the base material 1 to the body 7, lugs 61b, 61c of the first bracket 61 are fitted into the through-openings 21b, 21c in the upper area of the front surface portion 21, and the through-opening 21f and a hole 61f are aligned so as to inert a screw into them. A shaft-shaped projection 61d projecting from a main body 61a of the first bracket 61 is hooked on a hole K1 of a body-side member K as illustrated in FIG. 5, so that an upper part of the base material 1 is fixed to the body 7. Further, through-openings 62b, 62c provided in the second bracket 62 are positioned to the through-openings 22b, 22c of the bottom wall 221 and fixed thereto with screws, and a tip lug 62d of the second bracket 62 and a lug (not shown) are fitted into the through-opening 22d and the through-opening 22h. A hole provided in a bending distal end 62g projecting from a main body 62a of the second bracket 62 is threadedly attached to the body 7 via a screw thread V as illustrated in FIG. 6, so that a lower part of the base material 1 is fixed to the body 7. The first bracket 61 and the second bracket 62 are disposed on the inner-surface-1b side of the base material 1. Note that, in the present embodiment, in order to fix the base material 1 to the body 7 via the bracket 6, the attachment through-openings for the bracket 6 are provided. However, instead of this, a direct lug portion (not shown) to be locked to the body 7 can be provided integrally with the base material 1, for example, as described in Japanese Patent No. 5408360.

The inner portion 23 is a side plate portion bent to extend from an inner side edge of the front surface portion 21 in the vehicle width direction is opposed to an outer surface of the upright seatback 92. The inner portion 23 thus bent to extend from the inner side edge of the front surface portion 21 in the vehicle width direction is configured such that a main part forms a flat plate surface making contact with the outer surface of the seatback 92. A reference sign 23f indicates an outer rib provided in the inner portion 23, and a reference sign 231 indicates a penetration notch of a spindle that allows the seatback 92 to tilt. The outer portion 24 is a side plate portion bent to extend from an outer side edge of the body portion 2 in the vehicle width direction. The outer portion 24 is disposed on a side-body-71 side of a rear door 95, and a side edge 24m is gently curved. The outer portion 24 is provided with a protruding portion 3.

The protruding portion 3 is a plate piece body projecting from the body portion 2 outwardly relative to the outer portion among the front surface portion 21, the outer portion 24, and so on constituting the body portion. In the present embodiment, the protruding portion 3 is a plate piece body formed so as to project outwardly relative to the outer portion on the outer side in the vehicle width direction, starting from the outer portion 24 of the body portion 2. A plurality of (three) protruding portions 3 is formed along the side edge of the outer portion 24 so as to be distanced from each other. The protruding portion 3 made of resin and formed integrally with the body portion 2 is formed so as to project from the outer portion 24 such that a distal end 34 extending outwardly in the vehicle width direction is placed side by side with a flange portion 72a provided in a peripheral portion of the body 7 from a base-end-721 side toward a distal-edge-722 side. More specifically, as illustrated in FIG. 4, a projection first plate piece portion 31 of the protruding portion 3 extends first outwardly in the vehicle width direction from the outer portion 24, and then, its extension direction is changed such that a departing plate piece portion 32 extends toward a vehicle rear side. After that, a second plate piece portion 33 directed outwardly in the vehicle width direction extends, and then, a plate piece portion of the distal end 34 directed toward a vehicle front side extends. The protruding portion 3 is formed to project from the outer portion 24 such that a plate piece surface 34a of the distal end 34 is placed side by side with the flange portion 72a from a base-end-721 side of a flange surface PT to a distal-edge 722 side thereof. The flange portion 72a is placed in a body peripheral portion forming a vehicle rear side of a rear door opening. Rib-shaped flange portions 71a, 72a provided in two bodies 71, 72 form the vehicle rear side of the rear door opening. However, the plate piece surface 34a of the distal end 34 is placed side by side with the flange surface PT of the flange portion 72a disposed on a compartment side, from the vehicle rear side toward the vehicle front side.

When a weather strip 96 is attached to the flange portions 71a, 72a, the distal end 34 placed side by side with the flange surface PT can be sandwiched together with the flange portions. The protruding portion 3 has flexibility of the resin, and also has deformable followability such that the first plate piece portion 31 extends outwardly from the outer portion 24 so as to approach the flange portion 72a that forms the rear door opening, and the departing plate piece portion 32, the second plate piece portion 33, and the distal end 34 form a U-shape. A movement of the distal end 34 has elasticity, so that the distal end 34 can be easily attached such that the distal end 34 and the flange portions 71a, 72a are sandwiched by the weather strip 96. In a state where the plate piece surface 34a of the distal end 34 is placed side by side with the flange portion 72a from the base-end-721 side toward the distal-edge-722 side, and further, the plate piece surface 34a abuts with the flange surface PT, the weather strip 96 fastens two flange portions 71a, 72a and the distal end 34, as illustrated in FIG. 3. In FIG. 4A, an opening 960 of the weather strip 96 is opened so that the two flange portions 71a, 72a are sandwiched between an upper jaw 962 and a lower jaw 961. At this time, the base material 1 is formed such that the distal end 34 is placed along the flange portion 72a so that the distal end 34 of the protruding portion 3 is sandwiched and fastened together with two flange portions, as illustrated in FIG. 4B. When the door weather strip 96 fastens the protruding portion 3 with both flange portions 71a, 72a, the protruding portion 3 is fixed to the flange portion of the body 7 while preventing wind and rain, dust, and the like from coming inside from a gap around the door. Except for two places for the first bracket 61 and the second bracket 62, fixation of the base material 1 to the body 7 by the protruding portion 3 at a third place is secured. Since the third fixation place apart from the first, second brackets 61, 62 is provided, the base material 1 is fixed to the body 7 in a stable state without wobbling.

The protruding portions 3 are distanced from each other and provided at several places along the side edge 24m of the outer portion 24. The protruding portions 3 are sandwiched and fastened by the weather strip 96 together with the two flanges 71a, 72a. In addition to the fixation of the base material 1 by the first bracket 61 and the second bracket 62, the fixation of the base material 1 to the body 7 by the plurality of protruding portions 3 is secured at a place distanced from the first bracket 61 and the second bracket 62. Accordingly, the number of fixation places distanced from each other increases, and thus, a desired base material 1 more firmly fixed to the body 7 is obtained. Further, three protruding portions 3 are provided as illustrated in FIG. 2. However, instead of this, a protruding portion 3 obtained by connecting two protruding portions 3 on an upper side as illustrated in FIG. 7, for example, can be used. The protruding portion 3 in FIG. 7 is disposed along the side edge 24*m* of the outer portion 24, and is formed in a rib shape in which a length L1 along the side edge of the outer portion 24 is longer than a length L2 projecting outwardly from the outer portion 24. With such a configuration, a fixed area where the protruding portion 3 is fixed to the flange portions 71*a*, 72*a* by the weather strip 96 expands over the length L1 of the protruding portion along the side edge of the outer portion 24. The weather strip 96 attains a desired base material 1 fixed to a wide area of the body 7 in a line shape. Further, a protruding portion 3 of another configuration as a substitution for the one in FIGS. 1 to 6 is illustrated in FIG. 9. The protruding portion 3 of FIG. 9 is a protruding portion 3 formed so as to project outwardly relative to the outer portion 24 on the outer side in the vehicle width direction, starting from an inner surface of the front surface portion 21 of the body portion 2. The protruding portion 3 is formed to project not from the outer portion 24 of the body portion 2 as illustrated in FIG. 3, but from the front surface portion 21 as illustrated in FIG. 9. Further, the first plate piece portion 31, which is provided in FIG. 3, is not provided here. More specifically, after a departing plate piece portion 32 extends from the inner surface of the front surface portion 21 of the body portion 2 toward the vehicle rear side, its extension direction is changed such that a second plate piece portion 33 extends outwardly in the vehicle width direction. At a part between a base-end-side second plate piece portion 331 and a distal-end-side second plate piece portion 332, the second plate piece portion 33 extends toward the vehicle rear side in a stepped manner so as to avoid a distal end of the skin 5. The second plate piece portion 33 extends outwardly in the vehicle width direction, and then, a plate piece portion of a distal end 34 directed toward the vehicle front side extends so as to be placed side by side with the flange surface PT of the flange portion 72*a* from the base-end-721 side to the distal-edge-722 side. In addition to the flexibility of the resin protruding portion 3, the protruding portion 3 has deformable followability by forming a U-shape by the departing plate piece portion 32, the second plate piece portion 33, and the distal end 34. Hereby, the protruding portion 3 is formed such that the distal end 34 is easily placed side by side with the flange portion 72*a* from the base-end-721 side toward the distal-edge-722 side. The other configuration of the base material 1 having the protruding portion 3 of FIG. 9 is the same as FIGS. 1 to 6, so a description thereof is omitted. In FIG. 9, the same sign as in FIGS. 1 to 6 indicates the same or equivalent portion in FIGS. 1 to 6.

The seatback side BS of the present embodiment is the seatback side 93 as illustrated in FIG. 11 and employs the base material 1. The seatback side 93 is disposed on the outer side in the vehicle width direction relative to the upright rear seatback 92 of the rear seat 90 so as to fix the resin base material 1 to the body 7. In FIG. 11, a reference sign 97 indicates a headrest, a reference sign 98 indicates a pillar, a reference sign 99 indicates a package tray, and a reference sign BT indicates a seat belt. The base material 1 is a resin molded product in which the plate-piece shaped protruding portion 3 is formed in a projecting manner. The protruding portion 3 extends outwardly from the outer portion 24 provided on the outer side, in the vehicle width direction, of the body portion 2, so that the plate piece surface 34*a* of the distal end 34 is placed side by side with the flange surface PT directed from the base-end-721 side of the flange portion 72*a* of the body 7 toward the distal-edge-722 side thereof. The body portion 2 is elongated in line with the longitudinal length of the rear seat 90 in the upright state. When the weather strip 96 is attached to two flange portions 71*a*, 72*a* of the body 7, the distal end 34 of the protruding portion 3, placed side by side with the flange surface PT, can be sandwiched together therewith. The base material 1 is configured such that the plurality of protruding portion 3 is formed along the side edge 24*m* of the outer portion 24 so as to be distanced from each other, and the air-bag storage recess 22 is formed in the body portion 2 so as to be recessed from the outer-surface-1*a* side toward the inner-surface-1*b* side.

The seatback side BS includes the pad 4 and the skin 5 in addition to the base material 1. The pad 4 is a cushion body covering the outer surface 1*a* of the base material 1. The pad 4 is a foam molded product molded in a seatback side shape by use of a foaming resin material such as a polyurethane material. In the present embodiment, the seatback side BS is equipped with the air bag 8. As illustrated in FIG. 2, shaft portions 82 projecting from the air bag 8 are put through the holes 22*e*, 22*f* of the base material 1, and further holes 62*e*, 62*f* of the second bracket, so that the air bag 8 is fixed to the base material 1 by use of fasteners (not shown). The pad 4 covers an outer side of the base material 1 equipped with the air bag 8 as illustrated in FIG. 3, so as to form an outer shape of the seatback side BS. The pad 4 has a slit 40 formed on a side where a bag main body 81 of the air bag 8 expands, so that the bag main body 81 expands to be unfolded at the time of a vehicle collision.

The skin 5 is a sheet that covers at least an outer surface of the pad 4. The outer surface of the pad 4 is an occupant abutment side. As the skin 5, a fabric skin having permeability or a perforated leather skin having many small holes is used. In a case of the seatback side BS equipped with the air bag, 8, the skin 5 is a sewing skin 5 having a line-shaped sewn portion 50 provided at a position corresponding to an outer surface of the slit 40 of the pad 4, as illustrated FIG. 8. In the present embodiment, a stay cloth S is further provided as illustrated in FIG. 3, so that its distal end part is sewn with a thread 52 together with an outer seam 51 of the skin 5. The outer seam 51 is placed at a position corresponding to the slit 40. In the meantime, a base end part of the stay cloth S is put through a hole P1 of a reinforcement piece P fixed to the base material 1 so that the base end part is held in a locked manner. At the time of a collision, the stay cloth S guides and supports the bag main body 81 so as to expand to be unfolded forward smoothly. Note that, an upper stay cloth S in FIG. 3 is also held in a locked manner such that its base end part is put through a hole of a reinforcement piece (not shown). At the time of a vehicle collision, the thread 52 is cut by an inflation pressure of the bag main body 81, so that the bag main body 81 expands toward the front side relative to the seatback side BS as indicated by arrows in the figure. The bag main body 81 expands forward in the vehicle traveling direction from the seatback side BS so as to protect the occupant. The seatback side BS is provided on the outer side in the vehicle width direction relative to the occupant sitting on the rear seat 90.

The seatback side BS is a vehicle interior part in which a lug portion (not shown) that is formed integrally at the time of injection molding of the base material 1 or the bracket 6 in FIGS. 5, 6 fixed to the base material 1 by use of the through-openings is locked to a body-side member so as to fix the base material 1 to the body 7, and besides, the protruding portion 3 as new fastening means with respect to the body 7 is added. The outer portion 24 is provided with the protruding portion 3 so that the protruding portion 3 is placed along the flange portion 72*a* of the body 7 forming the rear door 95. When the flange portions 71*a*, 72*a* of the first, second bodies 71, 72 are sandwiched and fastened by the weather strip 96 as illustrated in FIGS. 4A, 4B, the protruding portion 3 is also sandwiched and fastened together, so that the protruding portion 3 is fixed to the flange portion 72*a* of the body 7, thereby forming a desired fixing structure of the seatback side BS. Since the protruding portion 3 is sandwiched by the weather strip 96, the outer portion 24 of the seatback side BS is firmly fixed. The outer portion 24 is placed on a rear-door-95 side. Moreover, the seatback side BS equipped with the air bag 8 has the following fixing structure for the seatback side BS: the air-bag storage recess 22 is formed in the body portion 2 so as to be recessed from the outer-surface-1*a* side toward the inner-surface-1*b* side, and the air bag 8 is attached to the air-bag storage recess 22; and the pad 4 and the skin 5 placed on the outer-surface-1*a* side thereof have the slit 40 and the sewn portion 50, respectively, at a part where the bag main body 81 expands to be unfolded at the time of a vehicle collision.

In the seatback side BS and the base material 1 for the seatback side, configured as described above, the protruding portion 3 projecting from the outer portion 24 is provided. In a case where the weather strip 96 is attached to the flange portions 71*a*, 72*a* of the first, second bodies 71, 72 forming the rear door 95, if the protruding portion 3 is sandwiched together with the flange portions, the protruding portion 3 is united with the flange portions, thereby making it possible to firmly fix the base material 1 to the body 7 at the place for the protruding portion 3. In a conventional lug portion or bracket 6 that utilizes the inner-surface-1*b* side of the body portion 2, a shape of the seatback side BS and an attachment place of the seatback side BS are limited, and further there is no space in which to provide a space for a clamping tool. For this reason, the fixation stops are limited to two places at the most. In order to increase the fixation places, it is necessary to provide a hole or a notch in a designed-surface-side skin 5, but it is impossible to provide the hole or notch therein. The plug projections in JP 2014-148251 A or the lug portions of Japanese Patent No. 4892585 are provided only at two places. In a case where the base material 1 is fixed to the body 7 only at two places, when an external force is applied to either one of right and left sides of a line connecting the two places, the base material 1 wobbles. In contrast, in the present invention, the protruding portion 3 projecting from the outer portion 24 distanced from two brackets 6 (or lug portions) that utilize the inner surface 1*b* of the base material 1 is fixed to the body 7 at the third place, so the base material 1 does not wobble with respect to the body 7. Since an object (the base material 1) is stabilized for the first time by three-point fixation in which three points are distanced from each other, the protruding portion 3 projecting from the outer portion 24 has a reasonable structural arrangement. When an occupant gets in or out of the vehicle through the rear door 95, the occupant often puts his/her hand on the seatback side BS. However, with the use of the base material 1 of the three-point fixation, a pressure that the occupant applies from the front side can be received well. Besides, on providing the protruding portion 3, a hole or a notch is not formed forcibly on the designed-surface-side skin 5 or the like. The protruding portion 3 can be easily formed integrally with the body portion 2 at the time of resin molding of the base material 1, which is extremely excellent. The protruding portions 3 are just disposed along the side edge 24*m* of the outer portion 24. Consequently, the base material 1 can be easily applied to various shapes, and further, since the base material 1 is made of synthetic resin, a reinforcement material can be set.

The inventors invented the following base material 93*a* ahead of the base material 1. In order to secure the third fixation place, the base material 93*a* is provided with a recessed portion 930 that is recessed from an inner surface side of the base material toward an outer surface side, and further, a base portion J2 of an L-shaped reinforcing piece J is fixed to the body 7 by screws such that an upright portion J1 is insertable into the recessed portion 930, as illustrated in FIG. 10. By the fixation by the recessed portion 930 at the third place, the base material 93*a* is stable without wobbling. However, the fixation to the body 7 is a blind operation in which the upright portion J1 is inserted into the recessed portion 930 from an outer surface of the base material. Therefore, its workability is low. In contrast, in the seatback side BS of the present invention and its base material 1, the protruding portions 3 are provided at a position where the protruding portions 3 can be easily seen by an operator at the time of a fixation operation. The protruding portions 3 can be easily fastened by the weather strip 96 together with the flanges 71*a*, 72*a*, and are excellent in workability. The protruding portions 3 are fastened just by adding a sandwiching operation of the protruding portions 3 to an existing sandwiching operation of the flange portions 71*a*, 72*a* by the weather strip 96. This does not become a work load in particular. Attachment fixation of the base material 1 to the vehicle body 7 is very easy. Without increasing a new operation step, stabilization and reinforcement of the base material 1 to the body 7 are attained, which contributes to quality improvement.

Since the protruding portions 3 are sandwiched by the weather strip 96 together with the flanges 71*a*, 72*a*, the base material 1 is positioned with respect to the body 7, which restrains a variation of the seatback side BS in the vehicle width direction, thereby improving an outward appearance of each interior part around the rear door opening. Furthermore, since the protruding portions 3 are sandwiched by the weather strip 96 together with the flange portions 71*a*, 72*a*, the body 7 and the protruding portions 3, eventually, the base material 1 are positioned in a vehicle front-rear direction, which functions to prevent interference with a wire harness WH disposed in a narrow space on the inner-surface-1*b* side of the base material 1 (FIG. 3).

Further, since the protruding portions 3 are provided in the outer portion 24, it is possible to provide the plurality of protruding portions 3 along the side edge of the outer portion so as to be distanced from each other. In view of this, fixation places of the base material 1 to the body 7 can be obtained at places where the plurality of protruding portions 3 is distanced from each other, thereby making it possible to fix the base material 1 to the body 7 can be fixed strongly and stably. Further, when the protruding portion 3 is disposed along the side edge 24*m* of the outer portion 24 and is formed in a rib shape in which the length L1 along the side edge of the outer portion is longer than the length L2 projecting outwardly from the outer portion, a fixation part of the protruding portion 3 to body 7 is changed from a point shape to a line shape. This makes it possible to more strongly fix the base material 1 to the body 7. Even at the time of a vehicle collision or the like, the base material 1 of the seatback side BS can be prevented from being removed from the body 7.

Further, in the seatback side BS in which the air bag 8 is incorporated, when the base material 1 wobbles, a jumping-out angle of the bag main body 81 at the time of a collision is not stable. However, the protruding portion 3 provided at a different place to be fixed to the body 7 can be secured apart from the bracket 6 and the lug portion, thereby making it possible to reduce wobbling of the seatback side BS after being attached to the vehicle and to stabilize the jumping-out angle of the bag main body 81. This plays an effective role in the measure for safety. When a plurality of protruding portions 3 is provided at several places or the protruding portion 3 is formed such that the length L1 along the side edge of the outer portion 24 is longer than the length L2 projecting outwardly from the outer portion 24, the number of places or a region where the base material 1 is fixed to the body 7 further increases, thereby making it possible to stabilize the jumping-out angle of the bag main body 81 and to improve its accuracy. In addition, with respect to a force to move the bag main body 81 forward along with the jumping out, the base material 1 can endure the force without following the bag main body 81, thereby making it possible to maintain a state where the base material 1 is fixed to the body 7. As such, the seatback side BS and the base material 1 for the seatback side are excellent in workability to fix the base material 1 to the body 7 without wobbling, and also extremely useful from the viewpoint of quality, safety, cost, and so on.

Note that the present invention is not limited to what is described in the above embodiment, but can be modified variously within a scope of the present invention according to an object and a purpose. Shapes, sizes, numbers, materials, and the like of the base material 1, the body portion 2, the protruding portion 3, the pad 4, the skin 5, the bracket 6, the body 7, the air bag 8, and so on can be selected appropriately according to a purpose of use.

What is claimed is:

1. A base material for a seatback side fixed to a body and disposed on an outer side in a vehicle width direction relative to an upright seatback of a rear seat, the base material comprising:
   a body portion including a protruding portion, wherein:
   the protruding portion has a plate piece surface of a distal end extending from the body portion outwardly relative to an outer portion provided on an outer side of the body portion in the vehicle width direction;
   the plate piece surface is placed side by side with a flange surface of a flange portion projecting in a peripheral portion of the body; and
   the distal end is sandwiched by a weather strip together with the flange portion.

2. The base material according to claim 1, wherein a plurality of protruding portions is placed along a side edge of the outer portion so as to be distanced from each other.

3. The base material according to claim 1, wherein:
   the protruding portion is placed along a side edge of the outer portion; and
   the protruding portion is formed in a rib shape in which a length along the side edge of the outer portion is longer than a length projecting outwardly from the outer portion.

4. The base material according to claim 1, wherein the body portion has an air-bag storage recess that is recessed from an outer surface side toward an inner surface side.

5. A seatback side disposed on an outer side in a vehicle width direction relative to an upright seatback of a rear seat, the seatback side comprising:
   a base material fixed to a body and including a protruding portion extending from a body portion of the base material outwardly relative to an outer portion provided on an outer side of the body portion in the vehicle width direction;
   a pad covering an outer surface of the base material; and
   a skin covering an outer surface of the pad, wherein:
   a plate piece surface of a distal end of the protruding portion is placed side by side with a flange surface of a flange portion projecting in a peripheral portion of the body; and
   the distal end is sandwiched by a weather strip together with the flange portion.

6. The seatback side according to claim 5, wherein:
   a plurality of protruding portions is placed along a side edge of the outer portion so as to be distanced from each other.

7. The seatback side according to claim 5, wherein:
   the body portion has an air-bag storage recess that is recessed from an outer surface side toward an inner surface side.

* * * * *